Sept. 28, 1926.
L. C. MARSHALL
PISTON PACKING
Filed August 20, 1921
1,601,575
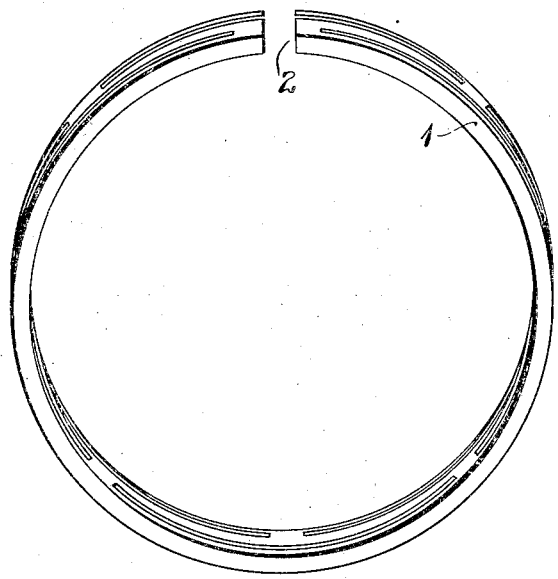
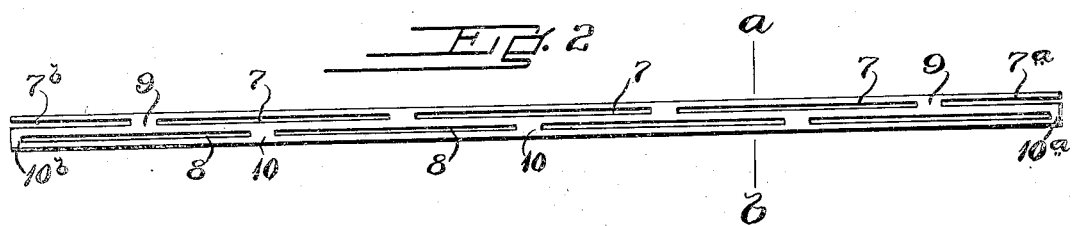
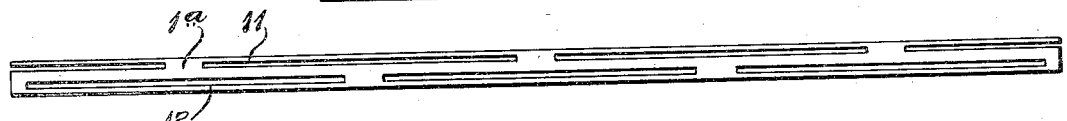
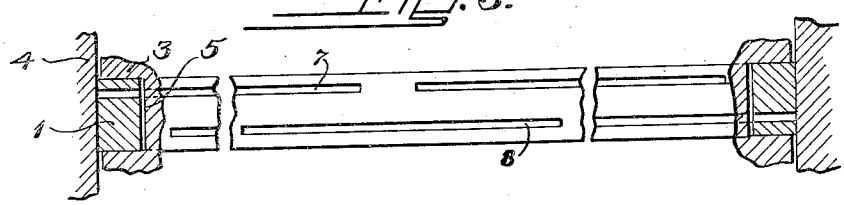
Inventor:
Lewis C. Marshall.
by Roberts Roberts Lumber
his atty's Patented Sept. 28, 1926.

1,601,575

UNITED STATES PATENT OFFICE.

LEWIS C. MARSHALL, OF WALPOLE, MASSACHUSETTS, ASSIGNOR, BY MESNE ASSIGNMENTS, TO THE SIMPLEX PISTON RING COMPANY OF AMERICA, OF CLEVELAND, OHIO, A CORPORATION OF OHIO.

PISTON PACKING.

Application filed August 20, 1921. Serial No. 493,793.

This invention concerns piston packing rings, and relates more particularly to split metallic rings of the type employed in connection with the pistons of internal combustion engines.

The function of such rings is to prevent leakage of gas or oil between the reciprocating piston and the contiguous wall of the cylinder and in order to accomplish its purpose it is necessary that such a ring be capable of expanding radially into contact with the cylinder wall.

In accordance with the usual practice the ring is seated in a circumferential groove in the piston and to permit its expansion it is evident that its engagement with the side walls of the groove must be such as to permit relative movement of the contacting parts. On the other hand, if an appreciable amount of clearance be left between the ring and the side walls of the piston groove, leakage of gas or oil beneath the ring may take place and such action is accentuated by the reciprocatory action of the piston which tends to move the ring axially in its groove, first in one direction and then in the other. The problem of maintaining a gas tight joint between the piston and its ring while permitting the ring to expand fully into contact with the cylinder wall has proven exceedingly difficult of solution from a practical standpoint and the principal object of the present invention is to provide a piston packing of simple and practical form and capable in an efficient manner of maintaining a substantially gas tight joint between the piston and ring as well as between the latter and the cylinder wall. With this object in view it is preferred to provide a unitary split ring capable of a substantial degree of expansion and contraction in an axial direction as well as radially. Such an axially elastic ring may well be made of a width equal to or greater than the piston groove, its axial compressibilty permitting it to be forced into the groove. The axial expansion of the ring into contact with the end walls of the groove would then in a highly effective manner prevent leakage around the ring as well as endwise reciprocation of the ring in its groove while at the same time the ring would be relatively free to expand radially of the groove.

In the accompanying drawings there is illustrated by way of example, one form of ring embodying the present invention and by the employment of which the above object may be attained.

In the drawings,—

Fig. 1 is a perspective view, illustrating a piston packing ring formed in accordance with the present invention;

Fig. 2 is a development of such ring illustrating to somewhat smaller scale the appearance of the circumferential surface thereof;

Fig. 3 is a fragmentary cross section through a piston and cylinder showing a piston ring arranged in the piston groove;

Fig. 4 is a view similar to Fig. 2, illustrating a modified form of ring; and

Fig. 5 is a section on line $a$—$b$ of Fig. 2.

The numeral 1 indicates a packing ring which may be of cast iron turned to substantially uniform axial width and having a gap 2 therein. The gap 2 extends transversely through the entire axial thickness of the ring as is usual in rings of this general type, and is of limited circumferential extent. The ring thus consists of a single integral annular turn or coil of substantially 360° circumferential extent and having its radial end surfaces disposed in substantially parallel planes. The ring as thus formed is radially resilient and when inserted in the piston groove tends to expand outwardly into contact with the cylinder walls thus making a tight joint therewith in the usual manner. Extending radially through the thickness of the ring are a series of elongated narrow slits 7, consisting, if desired, of saw kerfs extending through the metal. The series of slits 7 are arranged adjacent to one edge of the ring and are spaced apart at their ends by solid portions 9 of the ring. Spaced from the other edge of the ring is another series of slits 8 similar to the slits 7 and spaced apart at their ends by the solid portions 10. The slits of the two series are arranged in staggered relation, the solid, separating portion of the ring between adjacent slits of each series being substantially opposite the center of a slit of the opposite series. The endmost slit of one of the series is preferably so arranged as to be bisected by the gap 2 of the ring, thus providing open-ended slits 7ª, 7ᵇ, for example, of half the length of the normal slits and extending to the respective ends of the ring. The endmost separator member for the other series of slits is also bisected by the gap in the ring, providing the solid portions 10ª, 10ᵇ of half the usual length. Thus when the ends of the rings are brought together, the slits and the spacing members of each series extend symmetrically about the entire circumference of the ring.

In Fig. 3, a piston is indicated at 3, such piston sliding within the cylinder 4. The piston is provided with a circumferential slot 5 in the usual manner and in this slot is seated the ring 1. In accordance with the present invention the axial thickness of the ring is substantially equal to or greater than the width of the groove in the piston. The provision of the slits in the ring renders the latter highly elastic and compressible in an axial direction and it is thus possible by compressing such ring to force it into its groove, although its normal width is substantially greater than that of the groove. By arranging the slits and solid separator members of the two series in staggered relation, the axial compressibility of the ring is nearly uniform throughout its length and the ring when seated in its groove thus makes firm contact with both side walls of the same. The leakage of gas or oil past the ring is thus very effectually prevented while at the same time the elasticity of the ring is such as to permit its free expansion in a radial direction into contact with the cylinder wall. The unitary ring as thus constructed not only provides the necessary radial expansion but ensures a non-leaking contact of the ring with the piston groove.

In the arrangement shown in Fig. 4, the ring 1ª is substantially like that of Fig. 1 with the exception that the number of slits 11 and 12 extending circumferentially of the ring is less than that indicated in Fig. 2. Under some circumstances it may be found desirable to decrease the number of slits in a series, as indicated in Fig. 4, but it is considered preferable to employ substantially the number shown in Fig. 2. While the ring is indicated in Fig. 1 as having a butt joint, it is contemplated that the essential features of the invention might be embodied in rings of other types and having lapped joints of any desired form.

Having thus described the invention in a preferred embodiment of the same, what I claim and desire to secure by Letters Patent of the United States is:

1. The combination with relatively reciprocating members one of which has an annular groove therein, of a trans-split radially resilient ring for sealing between said members, said ring being circumferentially slotted to form an axially resilient portion intermediate opposite side portions, being also peripherally insertable into said annular groove and being of a normal width greater than that of the groove to develop a predetermined pressure between the opposite side portions of the ring and the respective sides of the groove, said pressure being limited to permit radial movement of the ring in the groove under working conditions.

2. The combination with relatively reciprocating members, one of which has an annular groove therein, of a transplit radially resilient ring for sealing between said members, said ring being provided with staggered series of slots to form an axially resilient portion intermediate opposite side portions being also peripherally insertable into said annular groove and being of a normal width greater than that of the groove to develop a predetermined pressure between the opposite side portions of the ring and the respective side portions of the groove, said pressure being limited to permit radial movement of the ring in the groove under working conditions.

3. The combination with relatively reciprocating members, one of which has an annular groove therein, of a trans-split radially resilient ring for sealing between said members, said ring being provided with staggered circumferential series of slots parallel to the sides of the ring and forming an axially resilient portion intermediate opposite side portions being also peripherally insertable into said annular groove and being of a normal width greater than that of the groove to develop a predetermined pressure between opposite side portions of the ring and the respective sides of the groove, said pressure being limited to permit radial movement of the ring in the groove under working conditions.

4. The combination with relatively reciprocating members, one of which has an annular groove therein, of a trans-split radially resilient ring for sealing between said members, said ring being circumferentially slotted to form an axially resilient portion intermediate opposite side portions, the end portions on opposite sides of the split having substantially equal resiliency, said ring being also peripherally insertable into said annular groove and of a normal width greater than the groove to develop a predetermined pressure between opposite side portions of the ring and the respective sides of the groove, said side pressure being substantially uniform in all portions of the ring and being limited to permit radial movement of the ring in the groove under working conditions.

5. A trans-split radially resilient ring circumferentially slotted to form an axially resilient portion intermediate opposite side portions and axially resilient end portions, the end portions on opposite sides of the split being symmetrical with respect to axial resiliency.

6. A trans-split radially resilient ring circumferentially slotted to form an axially resilient portion intermediate opposite side portions, the end portions on opposite sides of said split each having a slot therein extending to the split.

Signed by me at Boston, Massachusetts, this 13th day of August, 1921.

LEWIS C. MARSHALL.